United States Patent
Dmytriw et al.

(10) Patent No.: US 7,030,604 B1
(45) Date of Patent: Apr. 18, 2006

(54) THERMAL COEFFICIENTS OF NUDGE COMPENSATION AND TARE FOR LINEAR AND ROTARY MR ARRAY POSITION TRANSDUCERS

(75) Inventors: Anthony M. Dmytriw, Freeport, IL (US); Michael J. Latoria, Rockford, IL (US); Lamar F. Ricks, Freeport, IL (US); Curtis B. Johnson, Freeport, IL (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 11/223,071

(22) Filed: Sep. 8, 2005

Related U.S. Application Data

(63) Continuation-in-part of application No. 10/993,964, filed on Nov. 18, 2004, and a continuation-in-part of application No. 11/088,104, filed on Mar. 23, 2005.

(51) Int. Cl.
*G01B 7/30* (2006.01)
*G01B 7/14* (2006.01)

(52) U.S. Cl. .................. 324/207.12; 324/207.24; 324/207.25

(58) Field of Classification Search ............... None
See application file for complete search history.

(56) References Cited

U.S. PATENT DOCUMENTS

| | | | |
|---|---|---|---|
| 5,589,769 A | 12/1996 | Krahn | 324/207.26 |
| 6,097,183 A | 8/2000 | Goetz et al. | 324/207.12 |
| 6,509,732 B1 | 1/2003 | Rhodes et al. | 324/207.12 |
| 6,731,108 B1 | 5/2004 | Zalunardo et al. | 324/207.2 |
| 6,757,635 B1 | 6/2004 | Topmiller | 702/150 |
| 6,806,702 B1 | 10/2004 | Lamb et al. | 324/207.25 |

*Primary Examiner*—Bot LeDynh
(74) *Attorney, Agent, or Firm*—Kermit D. Lopez; Luis M. Ortiz

(57) ABSTRACT

Methods and systems are disclosed in which the errors caused by thermal expansion in magnetoresistive position transducers are reduced by predicting the physical alterations over temperature between centerline-to-centerline distances of particular magnetoresistive sensors or components within a magnetoresistive array and also between such an array and a magnet being sensed caused by thermal expansion.

20 Claims, 19 Drawing Sheets

$Nudge_{(compensated)} = Nudge_{(original)} + (Temp - Temp_{(original)}) * TC_{(N)}$ $$Tare_{(compensated)} = Tare_{(original)} + (Temp - Temp_{(original)}) * TC_{(N)}$$

THERMAL COEFFICIENTS OF NUDGE COMPENSATION AND TARE FOR LINEAR AND ROTARY MR ARRAY POSITION TRANSDUCERS

CROSS-REFERENCE TO RELATED PATENT APPLICATION

This patent application is a continuation-in-part of U.S. patent application Ser. No. 10/993,964 filed on Nov. 18, 2004, entitled "Angular Position Detection Utilizing a Plurality of Rotary Configured Magnetic Sensors," the disclosure of which is incorporated by reference herein in its entirety. This patent application is also a continuation-in-part of U.S. patent application Ser. No. 11/088,104, filed on Mar. 23, 2005, entitled "Position Detection Apparatus and Method for Linear and Rotary Sensing Applications," the disclosure of which is incorporated by reference in its entirety.

TECHNICAL FIELD

Embodiments are generally related to sensor methods and systems. Embodiments are also related to position detection devices. Embodiments are additionally related to magnetic sensors. Embodiments also relate to methods and systems for linear and rotary sensing applications. Embodiments additionally relate to thermal compensation methods and systems.

BACKGROUND

Magnetoresistive (MR) array technology is utilized in a variety of commercial, consumer and industrial detection applications. In some conventional MR systems an apparatus can be provided for determining the position of a member movable along a path. In such a device, a magnet can be attached to the movable member and an array of magnetic field transducers are located adjacent the path. As the magnet approaches, passes and moves away from a transducer, the transducer provides a varying output signal, which can be represented by a single characteristic curve that is representative of any of the transducers.

To determine the position of the movable member, the transducers are electronically scanned and data is selected from a group of transducers having an output that indicates relative proximity to the magnet. A curve-fitting algorithm can then be utilized to determine a best fit of the data to the characteristic curve. By placement of the characteristic curve along a position axis, the position of the magnet and therefore the movable member may be determined.

In another conventional MR device, a position determining apparatus can be implemented, which includes a magnet that is attached to a movable member that moves along a predefined path of finite length. An array of magnetic field transducers can be located adjacent to the predefined path. The transducers can provide an output signal as the magnet approaches passes and moves away from each transducer. A correction mechanism can also be provided to correct for residual error caused by the non-linearity of the transducers.

Such a correction mechanism preferably approximates the residual error with a predetermined function, and applies correction factors that correspond to the predetermined function to offset the residual error. By correcting for the non-linearity of the transducers, the length of the magnet may be reduced and/or the spacing of the transducers may be reduced.

An example of a conventional magnetic sensing approach is disclosed, for example, in U.S. Pat. No. 5,589,769, "Position Detection Apparatus Including a Circuit for Receiving a Plurality of Output Signal Values and Fitting the Output Signal Values to a Curve," which issued to Donald R. Krahn on Dec. 31, 1996, and is assigned to Honeywell International Inc. Another example of a magnetic sensing approach is disclosed in U.S. Pat. No. 6,097,183, "Position Detection Apparatus with Correction for Non-Linear Sensor Regions," which issued to Goetz et al. on Aug. 1, 2000 and is also assigned to Honeywell International Inc. U.S. Pat. Nos. 5,589,769 and 6,097,183 are incorporated herein by reference in their entirety. Such MR-based devices generally utilize discrete components on a Printed Circuit Board (PCB) assembly to yield the resulting function.

One of the problems with magnetoresistive sensors, particularly anisotropic magnetoresistive (AMR) sensors based on an array configuration, is that thermal expansion physically alters the relative position of the magnetoresistive sensors not only with respect to themselves but with respect to the magnet being sensed. This, in turn, induces an error in the magnetoresistive array positing determining algorithm being utilized. Thus, it is believed that a solution to this problem involves developing new methodologies and systems for compensating for thermal expansion. Such new solutions are disclosed in further detail herein.

BRIEF SUMMARY

The following summary is provided to facilitate an understanding of some of the innovative features unique to the embodiments and is not intended to be a full description. A full appreciation of the various aspects of the embodiments disclosed can be gained by taking the entire specification, claims, drawings, and abstract as a whole.

It is, therefore, one aspect of the present invention to provide for improved sensor methods and systems.

It is another aspect of the present invention to provide for an improved position detection device.

It is a further aspect of the present invention to provide for an improved AMR sensor.

It is an additional aspect of the present invention to provide for improved linear and rotary sensing applications.

The aforementioned aspects of the invention and other objectives and advantages can now be achieved as described herein. A method and system for the thermal compensation of magnetic linear and rotary sensing applications is disclosed. In general, signals generated by a plurality of magnetoresistive sensing components via an integrated circuit can be automatically amplified and calibrated in order to provide a full digital calibration and a ratio-metric output voltage or digital output signal indicative of linear and rotary position data. A predication can then be made involving one or more physical alterations over a particular temperature between a centerline-to-centerline distance associated with adjacent magnetoresistive sensing components among the plurality of magnetoresistive sensing components and between the plurality of magnetoresistive sensing components and at least one magnet caused by a thermal expansion thereof, in order to compensate for the thermal expansion and reduce temperature associated errors thereof. The magnetoresistive sensing components can be provided as an array of the magnetoresistive sensing components.

Thus, by adding the compensation methodologies and systems disclosed herein to existing position determining algorithms, the errors caused by thermal expansion in, for example, magnetoresistive position transducers, can be reduced by predicting the physical alterations over temperature between centerline-to-centerline distances of the particular magnetoresistive sensors or components within the array and also between such an array and the magnet being sensed caused by thermal expansion.

BRIEF DESCRIPTION OF THE DRAWINGS

The accompanying figures, in which like reference numerals refer to identical or functionally-similar elements throughout the separate views and which are incorporated in and form a part of the specification, further illustrate the embodiments and, together with the detailed description, serve to explain the principles of the disclosed embodiments.

DETAILED DESCRIPTION

The particular values and configurations discussed in these non-limiting examples can be varied and are cited merely to illustrate at least one embodiment and are not intended to limit the scope of the invention.

Figure 1:
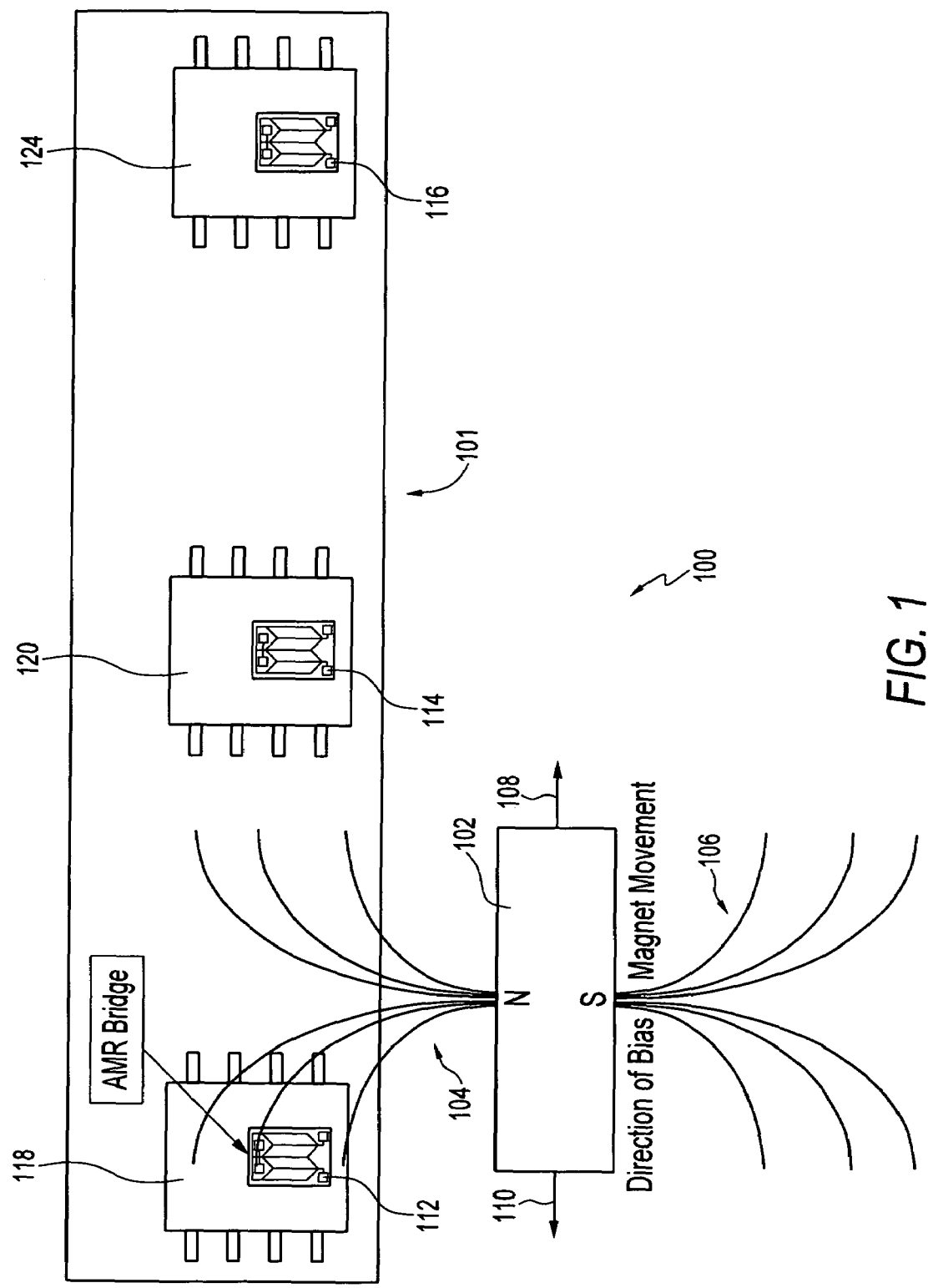
FIG. 1 illustrates a top view of a magnetoresistive sensing system.

FIG. 1 illustrates a top view of a magnetoresistive sensing system 100, which is described for general illustrative purposes and to depict the context in which a preferred embodiment can be implemented. System 100 generally includes one or more integrated circuit packages 118, 120, and 123 containing respective Wheatstone bridge circuits 112, 114, and 116. System 100 can also incorporate the use of an ASIC, i.e., Application-Specific Integrated Circuit, which is not shown in FIG. 1, but which may be utilized to control multiple Wheatstone bridge circuits, such as, for example, bridge circuits 112, 114, and 116. Bridge circuits 112, 114, and 116 can each be preferably implemented as anisotropic magnetoresistive (AMR) Wheatstone bridge circuits, depending upon design considerations. System 100 further includes a biasing magnet 102. Direction of the bias magnet movement associated with biasing magnet 102 is generally indicated by arrows 110 and 108. Magnetic field lines 104 and 106 associated with magnet 102 are also depicted in FIG. 1.

In general the AMR bridge circuits 112, 114 and 116 can be grouped together to form a magnetoresistive array 101. Note that although only three AMR bridge circuits 112, 114 and 116 are depicted in FIG. 1, magnetoresistive array 101 can be configured with more or few AMR bridge circuits and associated ASIC devices, depending upon design considerations. For example, it is possible to implement magnetoresistive array 101 with more integrated circuit packages containing associated AMR bridge circuits, depending upon design considerations.

The movement of the biasing magnet 108 generates a sinusoidal signal response from each magnetoresistive bridge circuit 112, 114, 116. The AMR bridge outputs generated by magnetoresistive bridge circuits 112, 114, 116 are similar to one another; however, their respective phases are shifted due to centerline-to-centerline spacing and their relative offsets and gains may differ as well thereof. Varying sensing schemes can therefore be implemented to interpolate between the AMR bridge circuits 112, 114, and 116 in order to achieve a high absolute accuracy.

Figure 2:
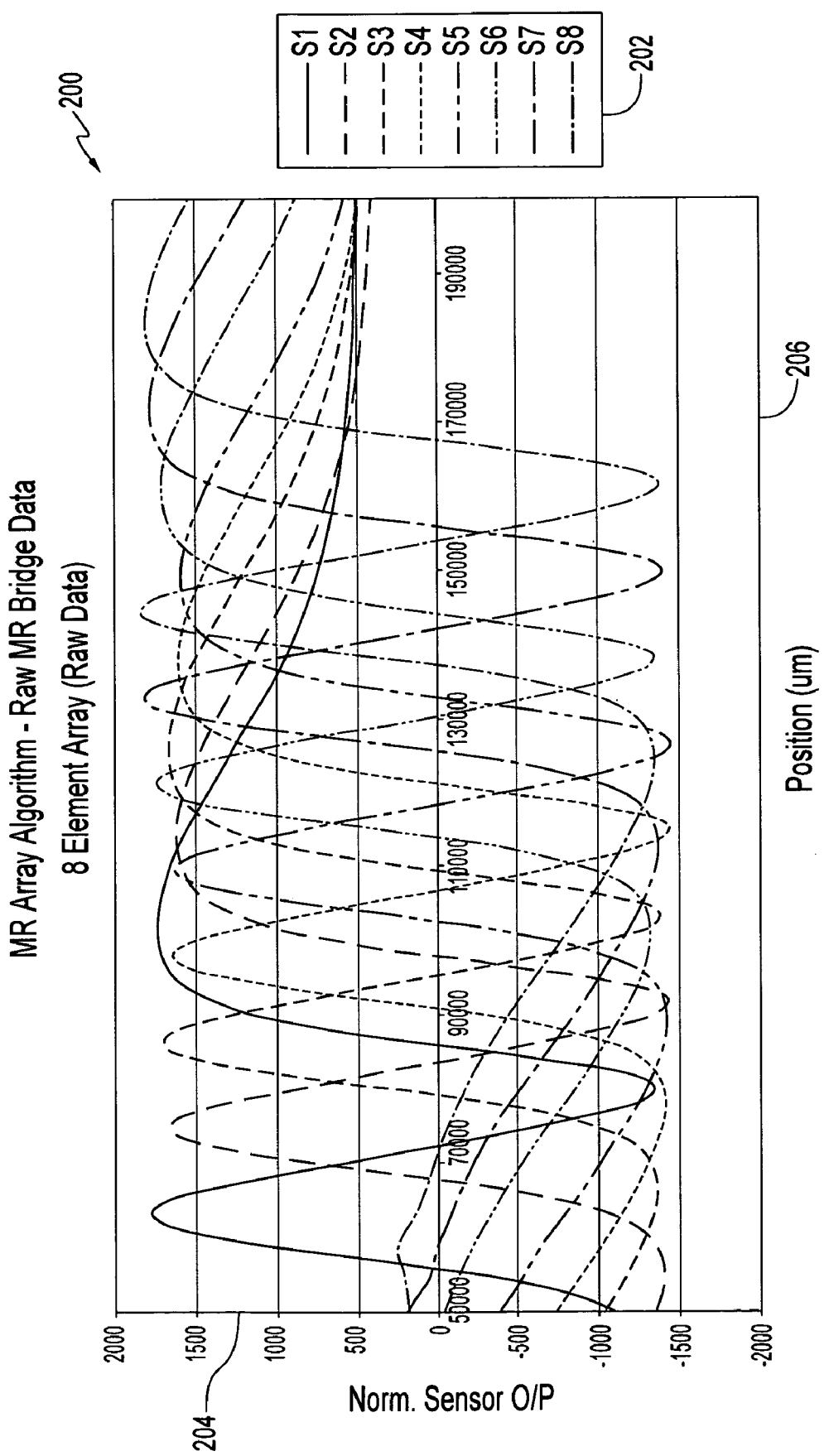
FIG. 2 illustrates a graphic depicting information generated as a result of a magnetoresistive array algorithm based on raw magnetoresistive bridge data.
Figure 3:
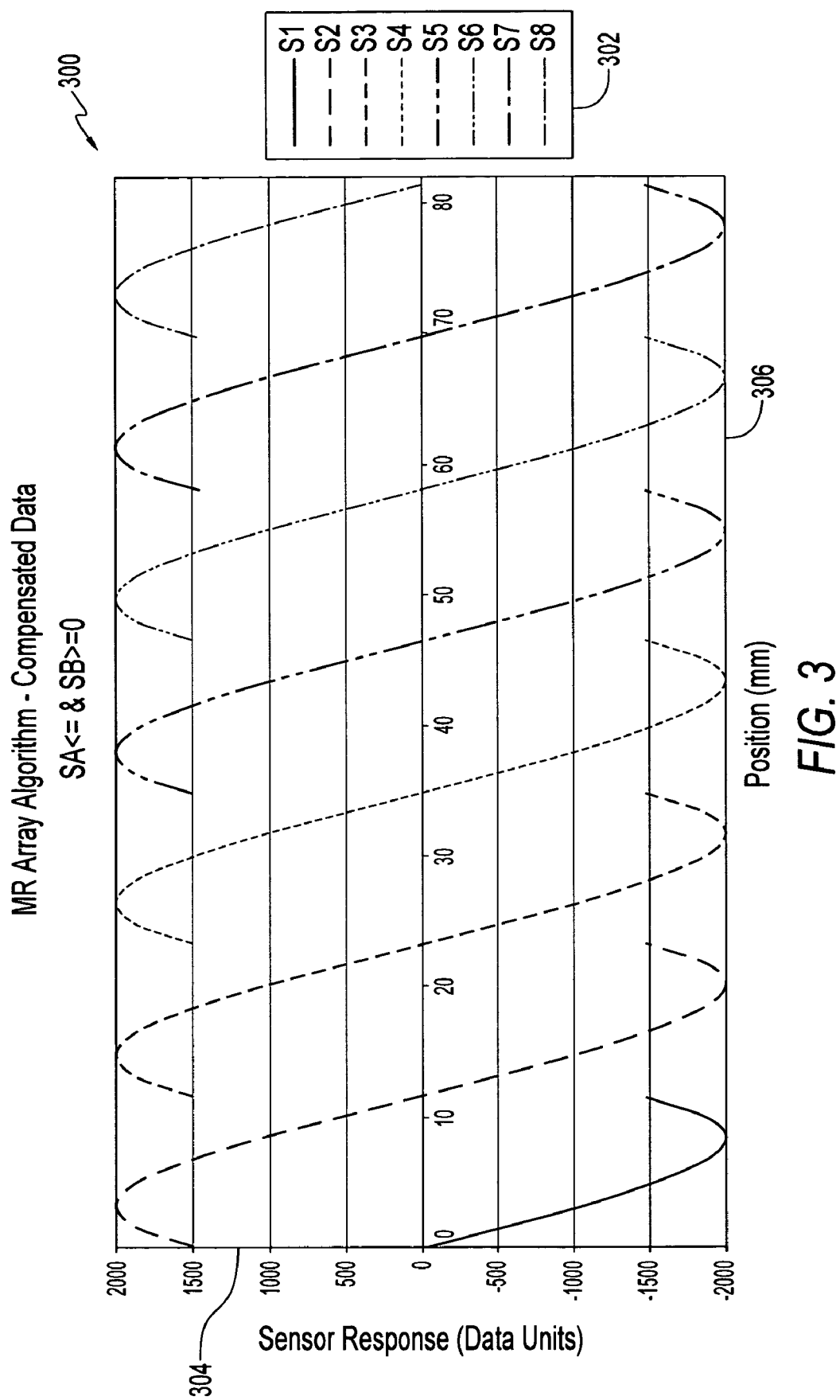
FIG. 3 illustrates a graph depicting information generated as a result of a magnetoresistive array algorithm based on compensated data.
Figure 4:
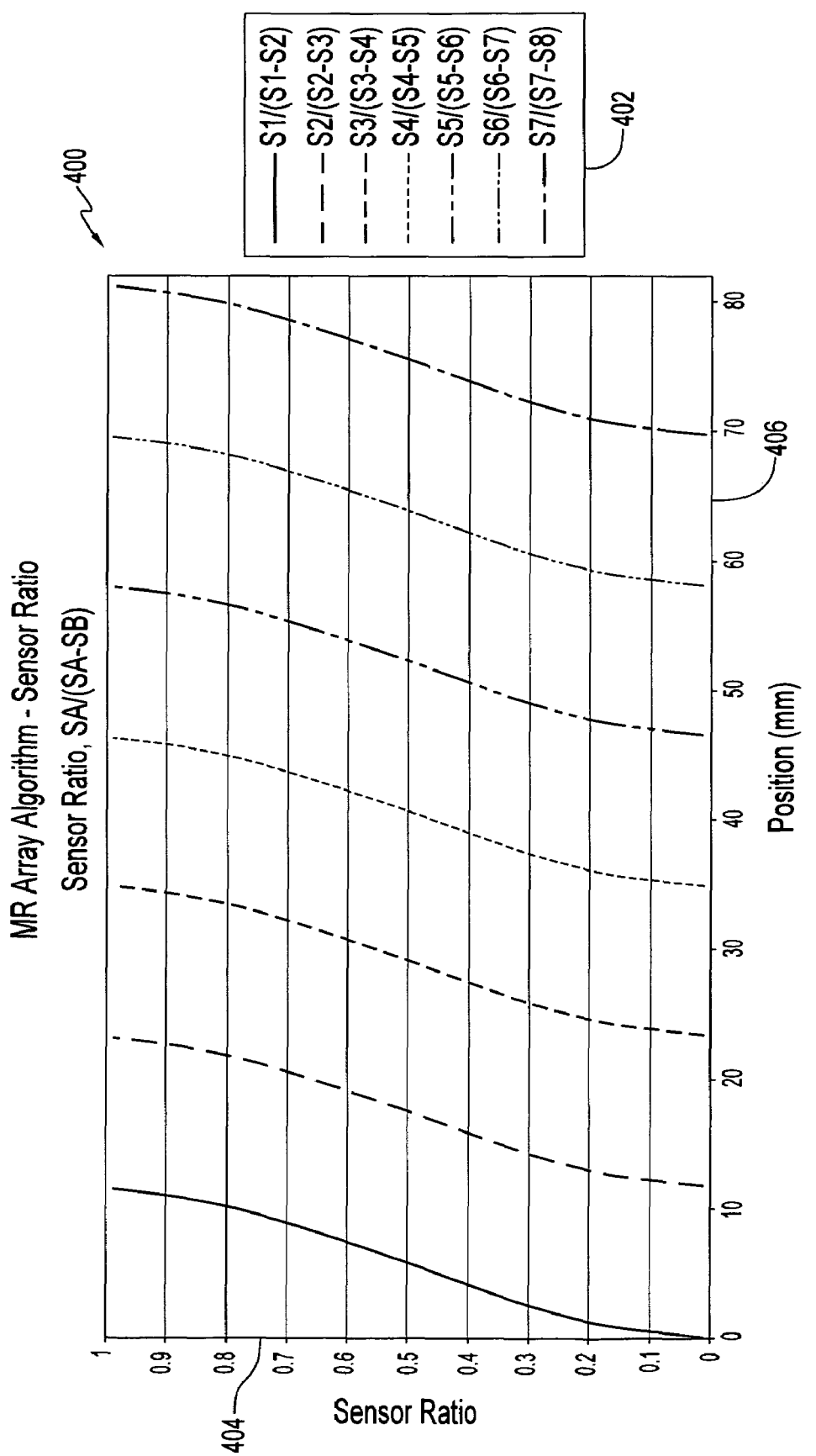
FIG. 4 illustrates a graph depicting information generated as a result of a magnetoresistive array algorithm based on sensor ratios.

FIG. 2 illustrates a graph 200 depicting information generated as a result of a magnetoresistive array algorithm based on raw magnetoresistive bridge data. Likewise, FIG. 3 illustrates a graph 300 depicting information generated as a result of a magnetoresistive array algorithm based on gain and offset compensated data. Similarly, FIG. 4 illustrates a graph 400 depicting information generated as a result of a magnetoresistive array algorithm based on sensor ratios.

Figure 5:
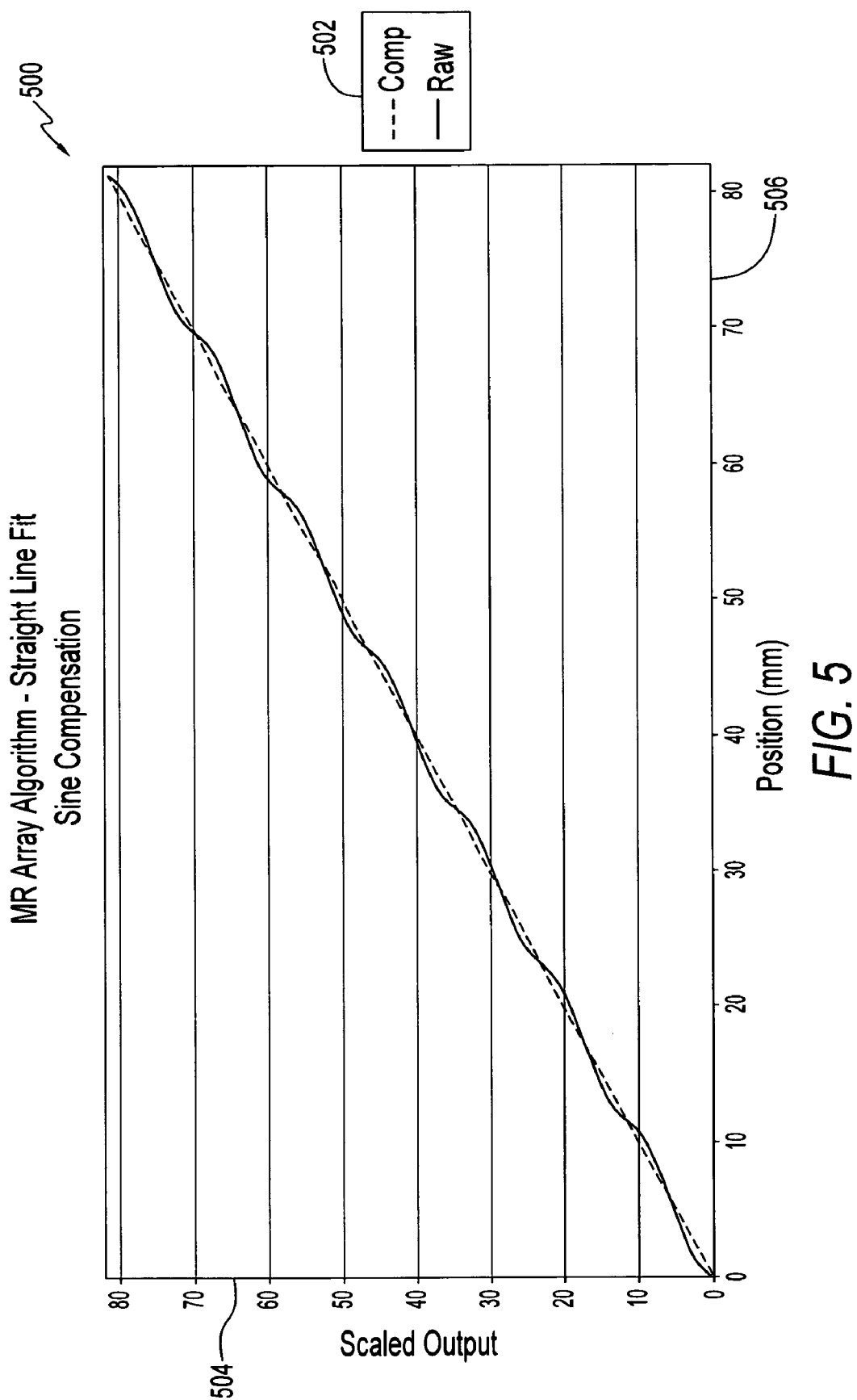
FIG. 5 illustrates a graph depicting straight line fit data generated as a result of a magnetoresistive array algorithm.

Finally, FIG. 5 illustrates a graph 500 depicting straight line fit data generated as a result a magnetoresistive array algorithm. Note that graphs 200, 300, 400 and 500 are presented in order to generally describe the magnetoresistive array theory of operation behind the illustrated embodiments, where are discussed in greater detail herein.

Figure 13:
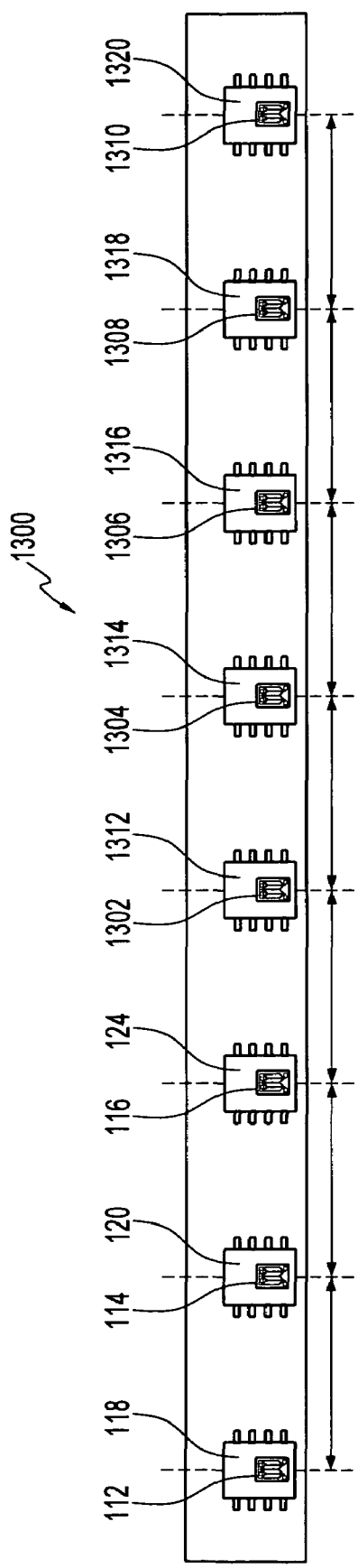
FIG. 13 illustrates an eight-bridge magnetoresistive array, which can be implemented in accordance with one embodiment.
Figure 14:
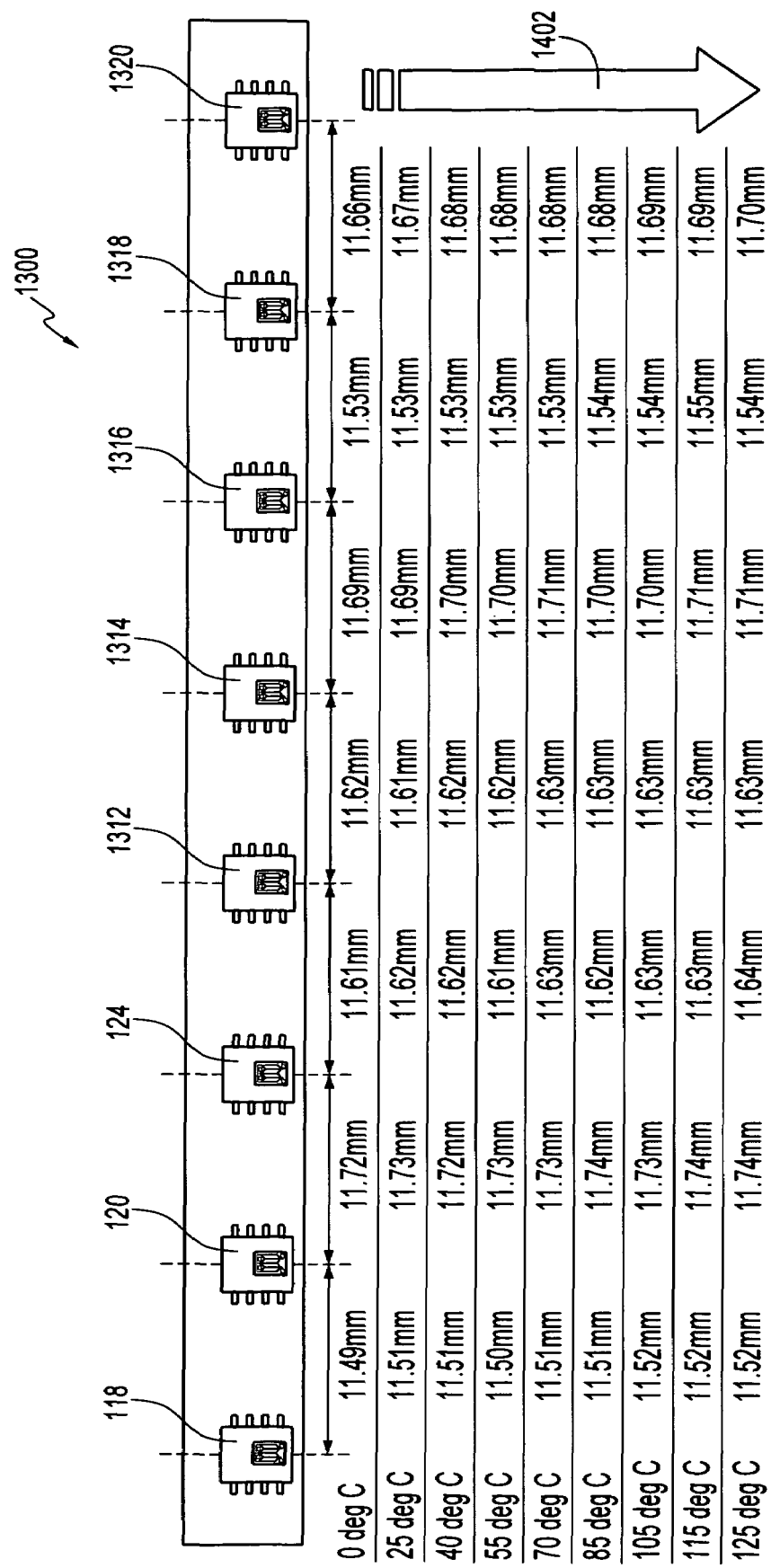
FIG. 14 illustrates the eight-bridge magnetoresistive array depicted in FIG. 13 in association with a table demonstrating the increase of centerline-to-centerline distances between adjacent magnetoresistive sensors over temperatures.

Graph 200 illustrates data that can be generated from an eight-element magnetoresistive array, such as the magnetoresistive array 101 depicted in FIG. 1 or, for example, the eight-bridge magnetoresistive array illustrated in FIGS. 13–14. Graph 200 generally depicts an abscissa 206 and an ordinate 204. A legend 202 is associated with respective data plots depicted in graph 200. The abscissa 206 tracks position data in micrometers, while the ordinate tracks relative sensor output data. Graph 200 therefore illustrates example curves for an eight-element magnetoresistive array with regular spacing.

Graph 300 illustrates data that can also be generated from an eight element magnetoresistive array. Graph 300 is associated with a legend 302 and includes an ordinate 304 associated with sensor response data (i.e., in data units) and an abscissa 306 that tracks position data in millimeters. In graph 300 all data is normalized and compensated for relative gain and offset. Graph 400 includes an associated legend 402 that indicates respective plots based on an ordinate 404 that tracks sensor ratio data an abscissa 406 that tracks position data in millimeters. In graph 400, sensor ratios remain constant over temperature.

Graph 500 includes a legend 502 that is associated with compensated and raw data, which are respectively depicted in graph 500. An ordinate 504 generally tracks scaled sensor's output data in millimeters, while an abscissa 506 tracks the actual position data in millimeters. Graph 500 generally presents linearization achieved as a result of Fourier compensation.

Figure 6:
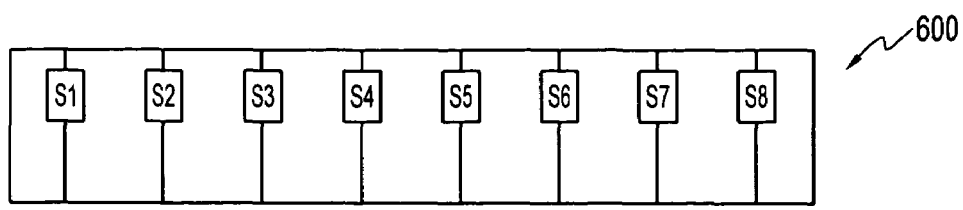
FIG. 6 illustrates an example linear magnetoresistive array, which can be implemented in the context of a printed circuit board (PCB) configuration.
Figure 7:
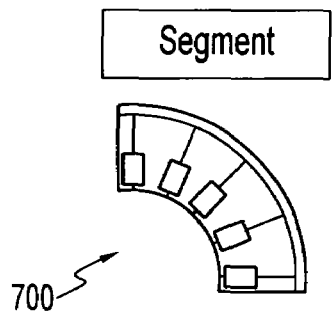
FIG. 7 illustrates a segment rotary magnetoresistive array, which can be implemented in the context of a PCB configuration.
Figure 8:
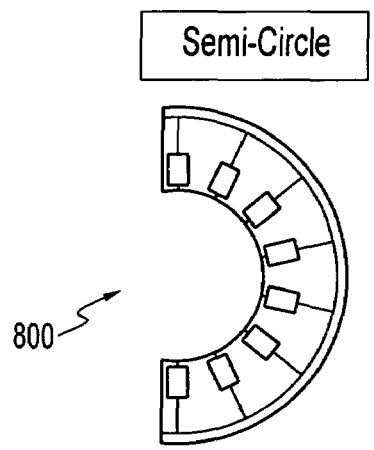
FIG. 8 illustrates a semi-circle rotary magnetoresistive array, which can be implemented in the context of a PCB configuration.
Figure 9:
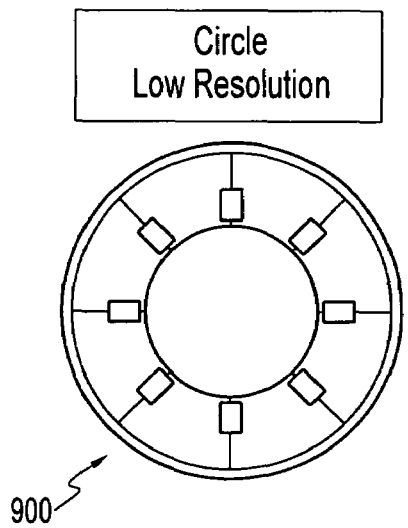
FIG. 9 illustrates a circular, low-resolution rotary magnetoresistive array, which can be implemented in the context of a PCB configuration.
Figure 10:
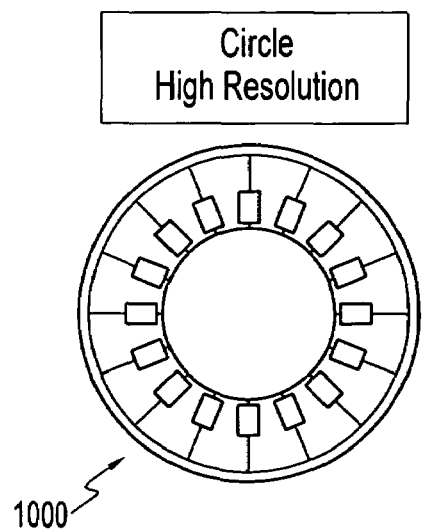
FIG. 10 illustrates a circular, high-resolution rotary magnetoresistive array, which can be implemented in the context of a PCB configuration.
Figure 11:
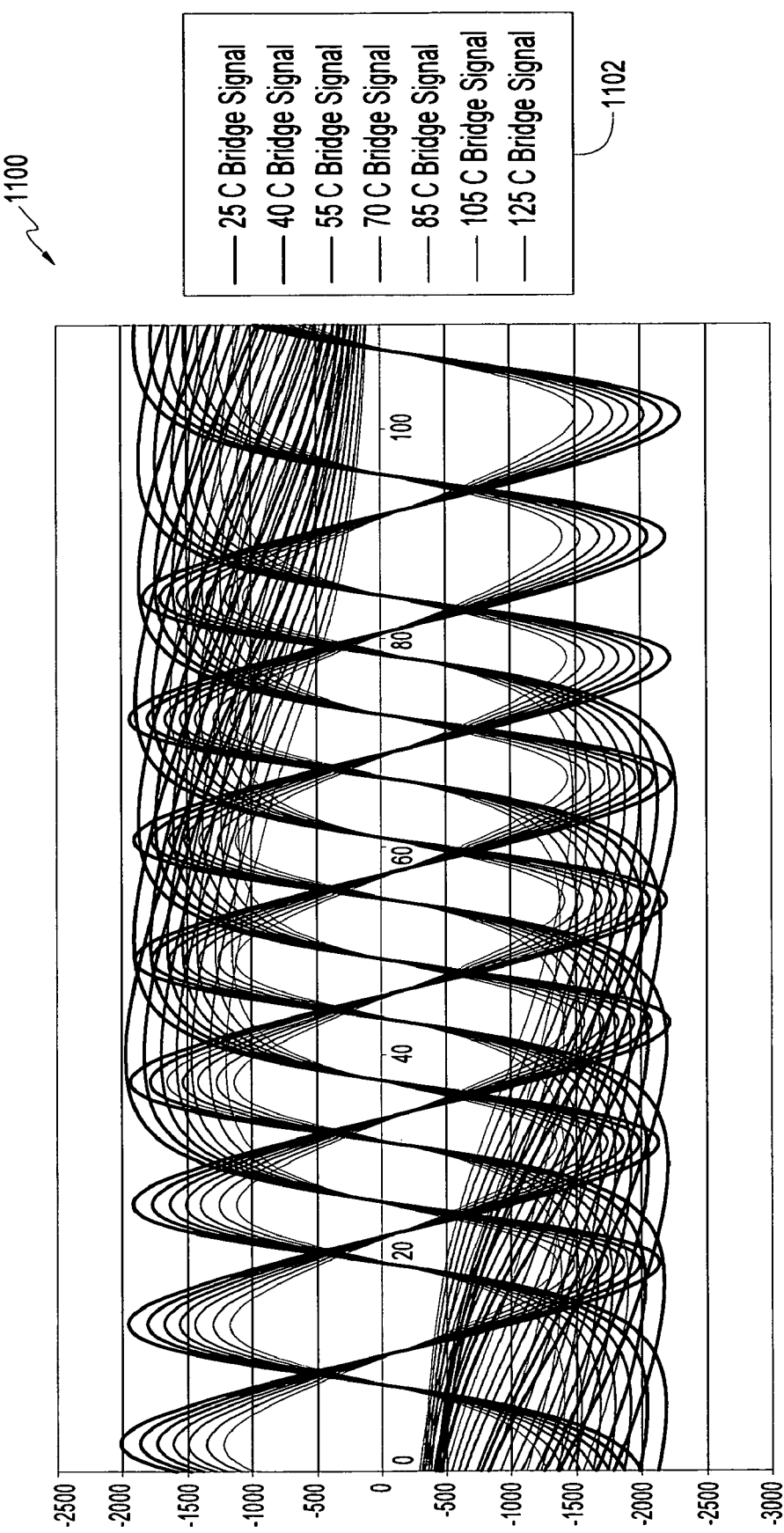
FIG. 11 illustrates a graph depicting data indicative of the effect of temperature on signals generated by a magnetoresistive array.

FIG. 6 illustrates an example linear magnetoresistive array 600, which can be implemented in the context of a printed circuit board (PCB) configuration. FIG. 7 illustrates, on the other hand, depicts, a segment rotary magnetoresistive array 700, which can be implemented in the context of a PCB configuration. FIG. 8 illustrates a semi-circle rotary magnetoresistive array 800, which can be implemented in the context of a PCB configuration; Likewise, FIG. 9 illustrates a circular, low-resolution rotary magnetoresistive array 900, which can be implemented in the context of a PCB configuration. FIG. 10 illustrates a circular, high-resolution rotary magnetoresistive array 1000, which can be implemented in the context of a PCB configuration;

FIG. 11 illustrates a graph 1100 depicting data indicative of the effect of temperature on signals generated by a magnetoresistive array, such as, for example arrays 101, 600, 700, 800, and/or 900. Graph 1100 is generally associated with a legend 1102. Graph 1100 is presented in order to indicate that the goal of current temperature compensation schemes is to bring signals back to their original form used in a calibration procedure by compensating for gain and offset shifts for each magnetoresistive sensor's output signal with respect to temperature.

Figure 12:
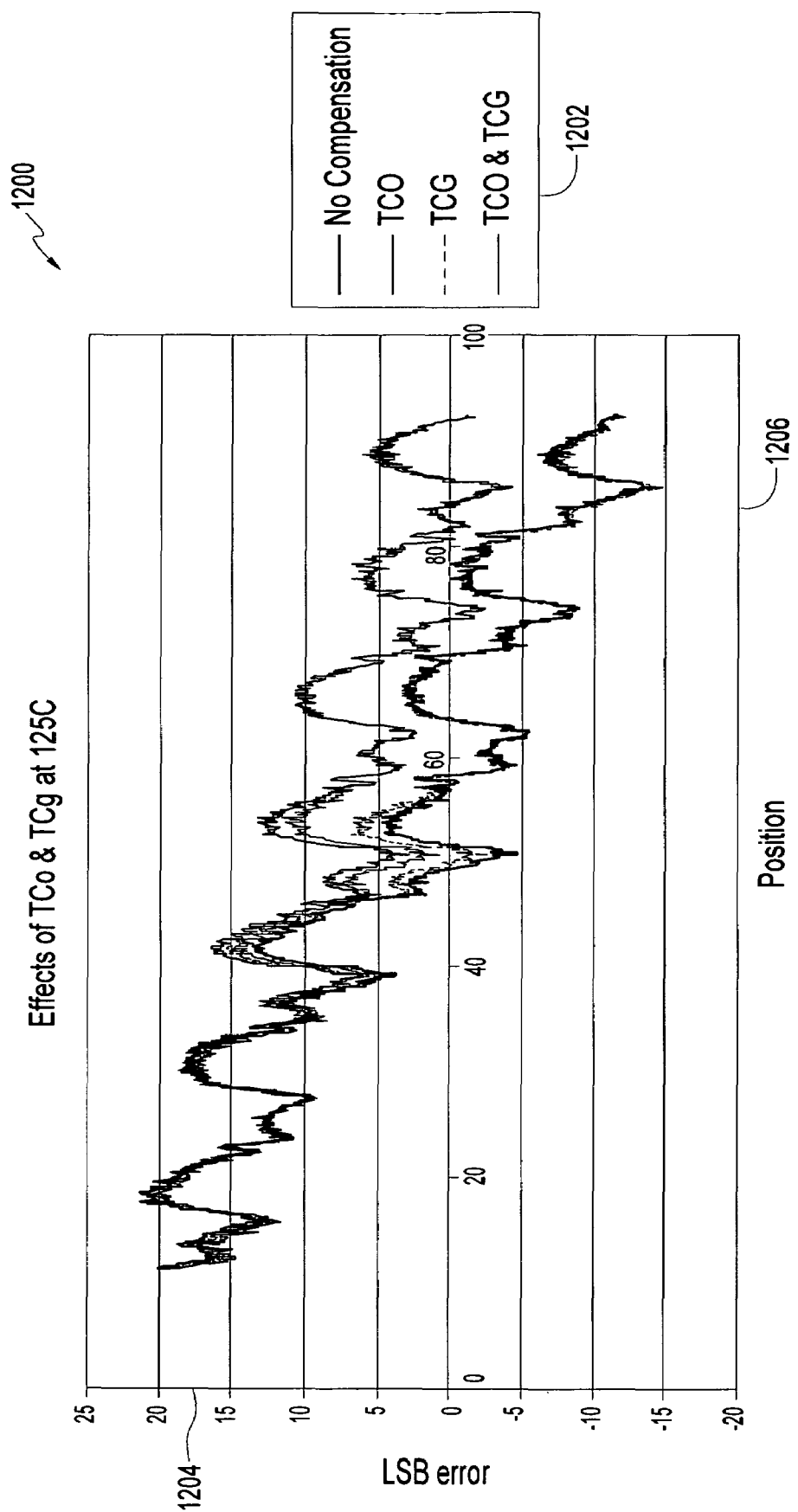
FIG. 12 illustrates a graph depicting the effects of compensating for gain and offset shifts caused by temperature changes.

FIG. 12 illustrates a graph 1200 depicting the effects of compensating for gain and offset shifts caused by temperature changes. Graph 1200 is associated with a legend 1202, which generally coincides with "no compensation," $TC_O$, $TC_G$, and $TC_O$ and $TC_G$. A ordinate 1204 tracks LSB error data, while abscissa 1206 tracks position data. In general, graph 1200 indicates that by compensation for Gain ($TC_G$) and Offset ($TC_O$), a 40% reduction in LSB (least significant bits) or quantization level errors can be observed at a temperature of 125° C.

FIG. 13 illustrates an eight-bridge magnetoresistive array 1300, which can be implemented in accordance with one embodiment. In general, magnetoresistive array 1300 includes eight AMR bridge circuits 112, 114, 116, 1302, 1304, 1306, 1308, 1310, which are respectively associated with integrated circuit packages 118, 120, 124, 1312, 1314, 1316, 1318, and 1320. In general, at room temperature, the eight-bridge magnetoresistive array 1300 can be designed to possess a magnetoresistive sensor centerline-to-centerline distance that is equivalent to 11.61 mm as depicted in FIG. 13. Data compiled from magnetoresistive array 1300 can indicate that the centerline-to-centerline distance can vary from the nominal 11.61 mm. A compensation mechanism can be implemented to correct for the residual error caused by non-perfect sensor spacing. Such a compensation mechanism can be referred to by the term "nudge". Thus, a nudge term for each magnetoresistive sensor in array 1300 can be implemented to account for different centerline-to-centerline spacing.

It is therefore believed that a correction for imperfect centerline-to-centerline distances over temperature can be implemented. As thermal expansion occurs, the magnetoresistive sensors' centerline-to-centerline distance changes. Anticipating this change can result in a significant performance increase in magnetoresistive array position transducer. Such a thermal correction term can be referred to by the variable $TC_N$, which represents thermal coefficient for nudge compensation.

FIG. 14 illustrates the eight-bridge magnetoresistive array 1300 depicted in FIG. 13 in association with a table 1400 demonstrating the increase of centerline-to-centerline distances between adjacent magnetoresistive sensors over temperatures. Arrow 1402 indicates the physical change in the magnetoresistive array 1300 over temperature. Table 1400 demonstrates the increase of centerline-to-centerline distances between adjacent magnetoresistive sensors over temperature for the particularly array 1300. Note that in FIGS. 13–14, identical or similar parts or elements are indicated by identical reference numerals.

Figure 15:
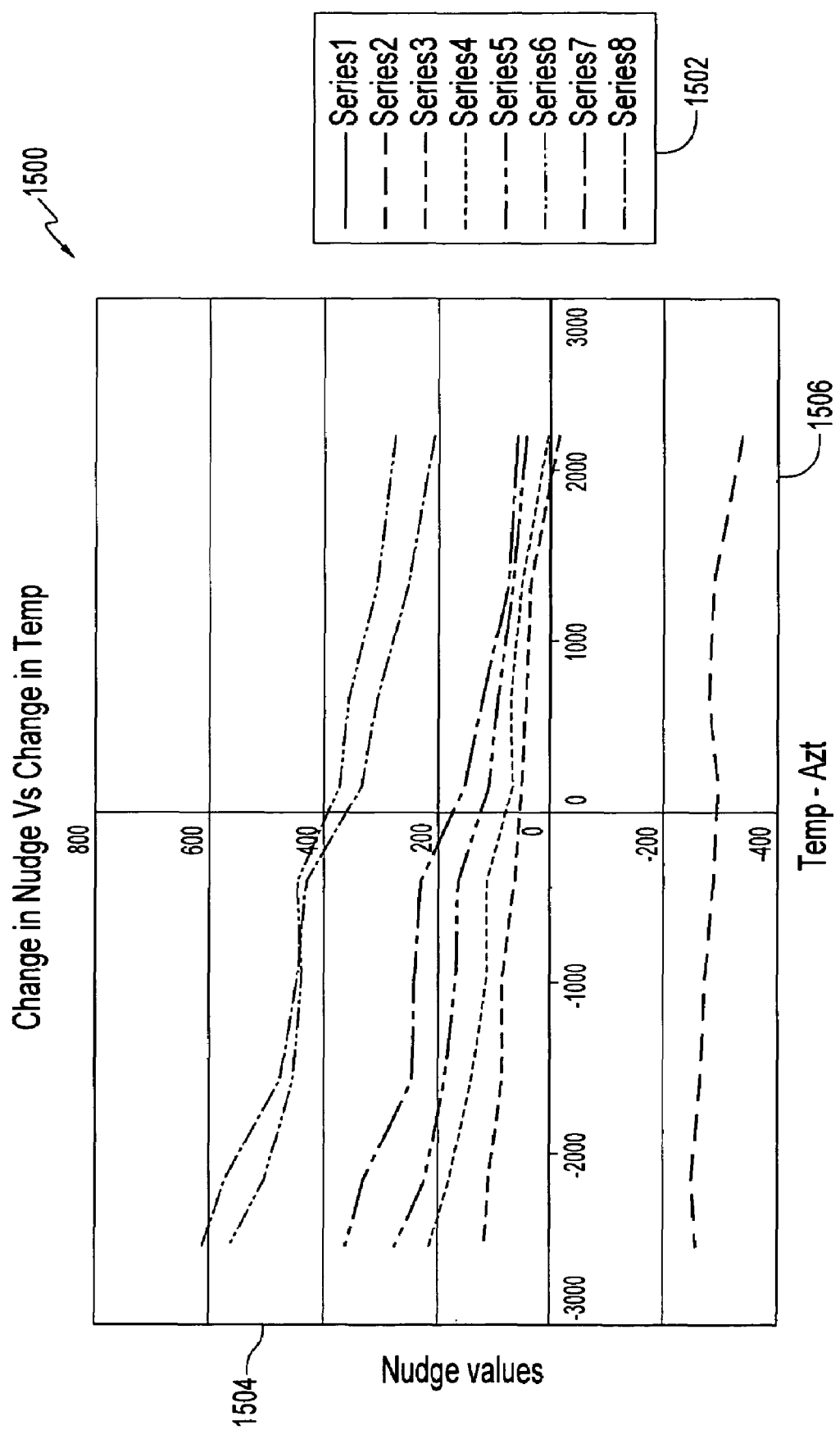
FIG. 15 illustrates a graph depicting changes in nudges with respect to temperature, in accordance with an embodiment.

FIG. 15 illustrates a graph 1500 depicting changes in nudges with respect to temperature, in accordance with an embodiment. Graph 1500 generally includes a legend 1502 associated with graph 1500. An ordinate 1504 tracks relative nudge values, while an abscissa 1506 tracks temperature data. For each change in centerline-to-centerline distance, there is a corresponding change in the associated nudges. Graph 1500 demonstrates the change in nudge values with respect to temperature for each magnetoresistive bridge circuit, such as, for example, AMR bridge circuits 112, 114, 116, 1302, 1304, 1306, 1308, 1310.

Figure 16:
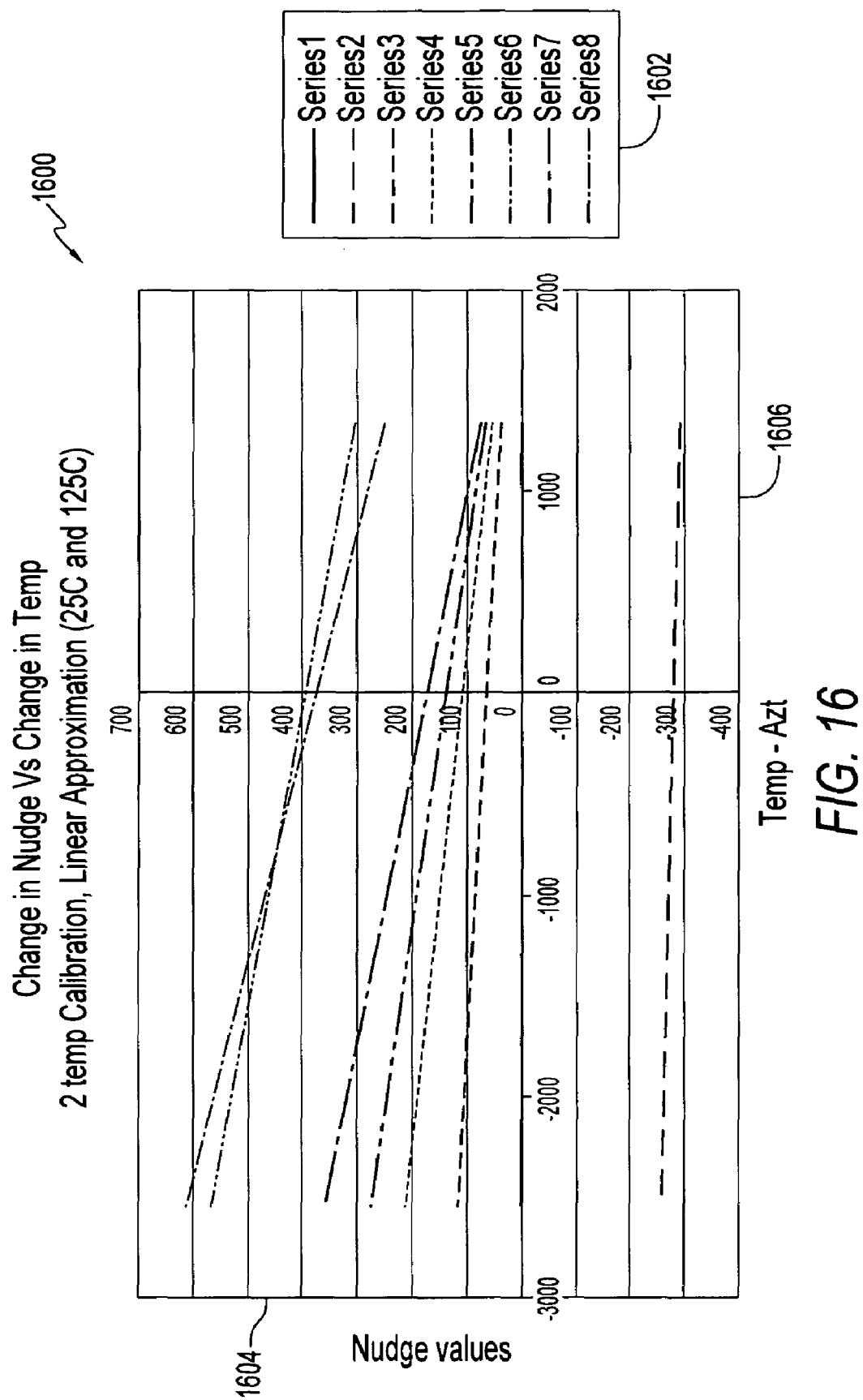
FIG. 16 illustrates a graph depicting changes in nudges with respect to temperature and linear approximation, in accordance with an embodiment.

FIG. 16 illustrates a graph 1600 depicting changes in nudges with respect to temperature and linear approximation, in accordance with an embodiment. Graph 1600 is generally associated with a legend 1602. An ordinate 1604 generally tracks nudge values, while an abscissa 1606 tracks temperature data. Graph 1600 indicates a two temperature calibration can be performed in order to determine the associated change in nudge divided by change in temperature or $TC_N$. Note that in graph 1600, the slope of each line illustrated therein represents the $TC_N$ for a corresponding magnetoresistive sensor.

Figure 17:
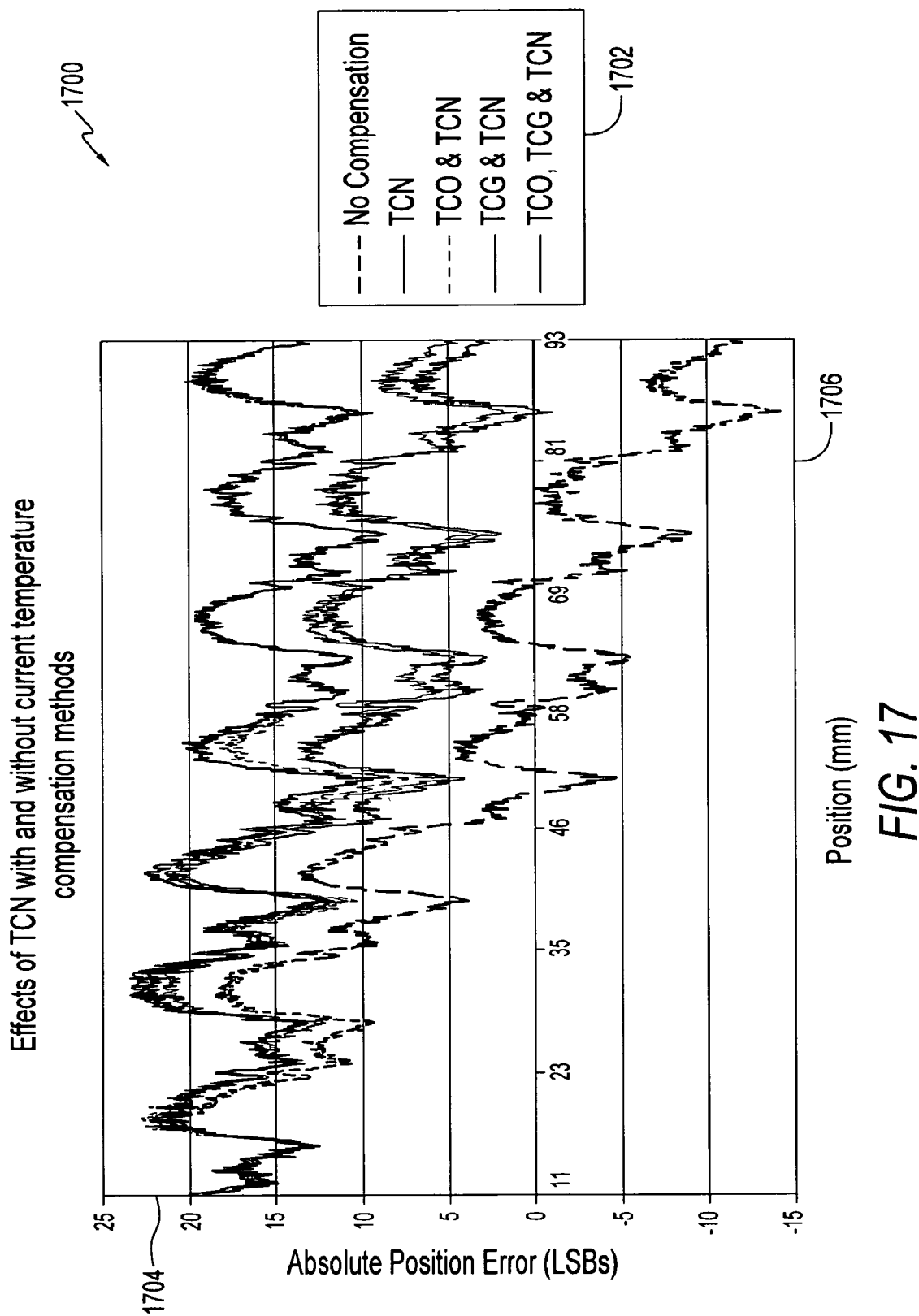
FIG. 17 illustrates a graph depicting the effect of $TC_N$ on a position transducer, in accordance with an embodiment.

FIG. 17 illustrates a graph 1700 depicting the effect of $TC_N$ on a position transducer, in accordance with an embodiment. Graph 1700 generally includes a legend 1702 and an ordinate 1704 that tracks absolute position error data. An abscissa 1706, on the other hand, tracks position data in millimeters. Graph 1700 indicates the $TC_N$, along with the current temperature compensation techniques, attempt to re-linearize the output of the position transducer. This produces a smaller span in LSB (least significant bits or quantization levels) error over the length of the magnetoresistive array 1300.

Figures 18, 19:
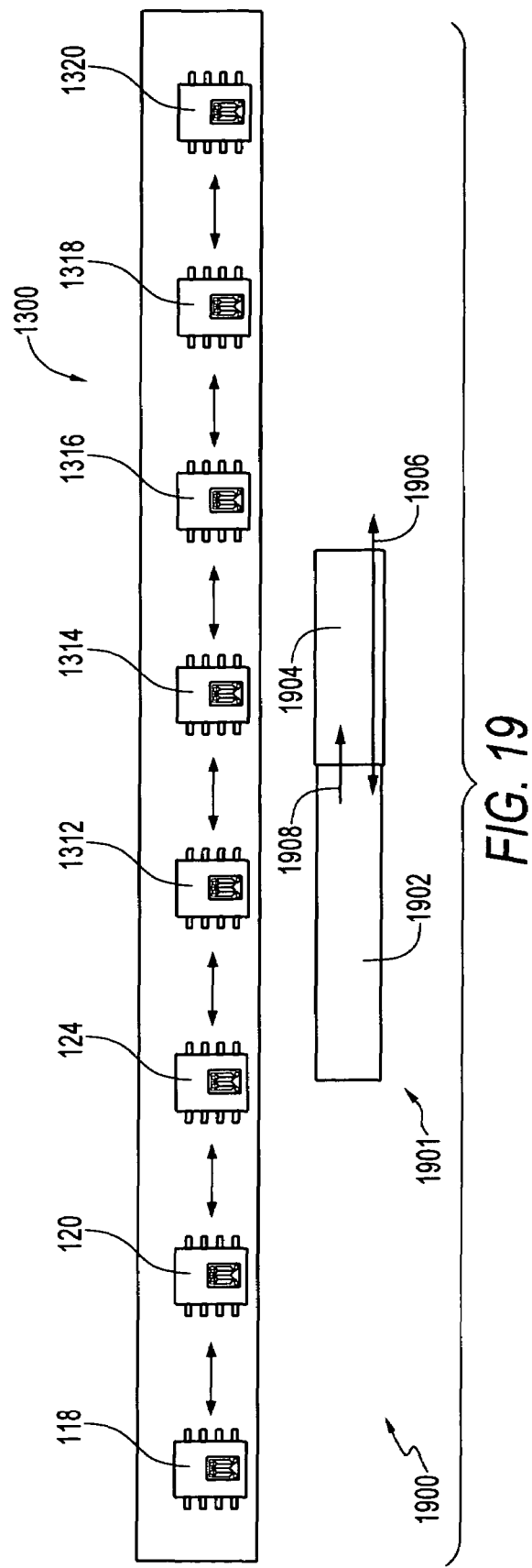
FIG. 18 illustrates a block diagram depicting a possible example equation for calculating a $TC_N$ for each magnetoresistive sensor depicted in FIGS. 13–14, in accordance with a preferred embodiment.
FIG. 19 illustrates a block diagram depicting a magnetoresistive sensor system that includes the expansion of a magnetoresistive array, an associated magnet and a fixture holding the magnet as temperature increases, in accordance with a preferred embodiment.

FIG. 18 illustrates a block diagram 1800 depicting one example equation 1802 for calculating a $TC_N$ for each magnetoresistive sensor depicted in FIGS. 13–14, in accordance with a preferred embodiment. In general, after a two temperature calibration, it is possible to calculate a $TC_N$ for each magnetoresistive sensor or AMR bridge circuit 112, 114, 116, 1302, 1304, 1306, 1308, and 1310. The math described by equation 1802 can be accomplished within an associated ASIC, such as, for example, ASIC 2500 or ASIC 2506 depicted in FIG. 25 in order to compensate for the change in nudge values with respect to temperature before applying such values in a position determination algorithm.

FIG. 19 illustrates a block diagram depicting a magnetoresistive sensor system 1900 that includes the expansion of magnetoresistive array 1300, an associated magnet 1904 and a fixture 1902 that maintains the magnet 1904 as temperature increases, in accordance with a preferred embodiment. Arrow 1906 generally indicates the change in magnet 1904 due to thermal expansion over temperature. Arrow 1908 generally indicates the change in the magnet carrying fixture 1902 due to thermal expansion over temperature. Note that in FIGS. 13–14 and 19, identical or similar parts or elements are generally indicated by identical reference numerals. In general, it is possible to select a position of the start point for the position transducer. The term utilize to set this point can be referred to as "tare" and is similar to the "tare" feature utilized on a digital scale.

With $TC_N$ (i.e., discussed earlier), it is also possible to compensate for the thermal compensation of, for example, an magnetoresistive array substrate, which causes different centerline-to-centerline distances between magnetoresistive sensors over temperature. To date, however, it has not been possible to compensate for the inherent offset as the relative position between the magnetoresistive array and the magnet being sensed changes due to the thermal expansion of the system. A new thermal coefficient, $TC_T$, can be utilized to compensate for such changes due to temperature. In general, $TC_T$ allows for the adjustment of the tare term, which shifts the output of the sensor as the system expands due to temperature. Such a feature can eliminate the inherent offset that results from the change in relative position.

Figures 20, 21:
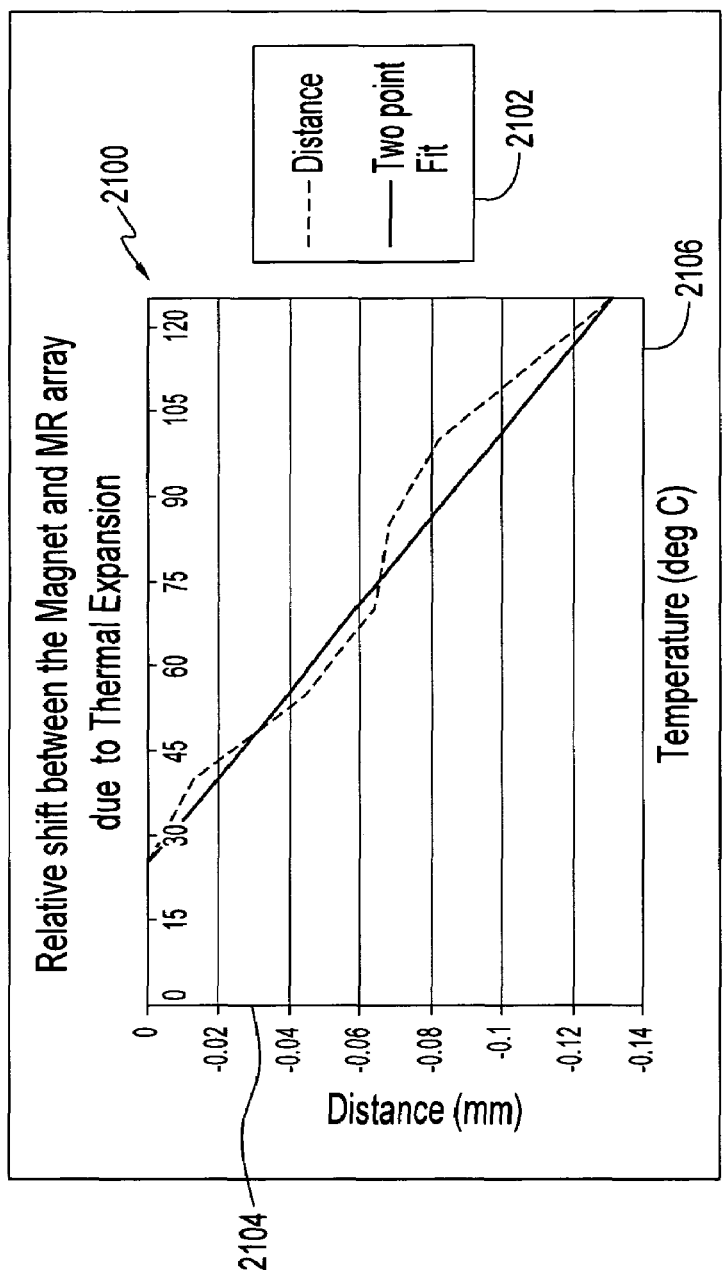
FIG. 20 illustrates a block diagram depicting an equation for calculating $TC_T$ after a two-temperature calibration in accordance with a preferred embodiment.
FIG. 21 illustrates a graph depicting the relative shift between the magnet and the magnetoresistive array illustrated in FIG. 19 due to thermal expansion, in accordance with a preferred embodiment.

FIG. 20 illustrates a block diagram 2000 depicting an equation 2002 for calculating $TC_T$ after a two-temperature calibration in accordance with a preferred embodiment. In general, equation 2002 indicates that after a two temperature calibration, it is possible to calculate the $TC_T$ term. Equation 2002 can be processed via a software algorithm utilizing an associated ASIC, such as, for example, ASIC 2500 or ASIC 2506 depicted in FIG. 25. In order to compensate for the change in tare with respect to temperature, before applying such compensation information to a position determining algorithm.

FIG. 21 illustrates a graph 2100 depicting the relative shift between the magnet and the magnetoresistive array illustrated in FIG. 19 due to thermal expansion, in accordance with a preferred embodiment. A legend 2102 is generally associated with graph 2100 and indicates distance and two point fit data plots, which are depicted in greater detail within graph 2100. An ordinate 2104 generally tracks distance in millimeters, while an abscissa 2106 generally tracks temperature in degrees Celsius. Graph 2100 indicates that thermal expansion can cause the entire sensor system to generate an associated output offset that does not correspond to an actual change. Graph 2100 therefore illustrates a relative position change for a magnetoresistive array (e.g., magnetoresistive array 1300) and a magnet (e.g., magnet 102 or 1904) being sensed over temperature.

Figure 22:
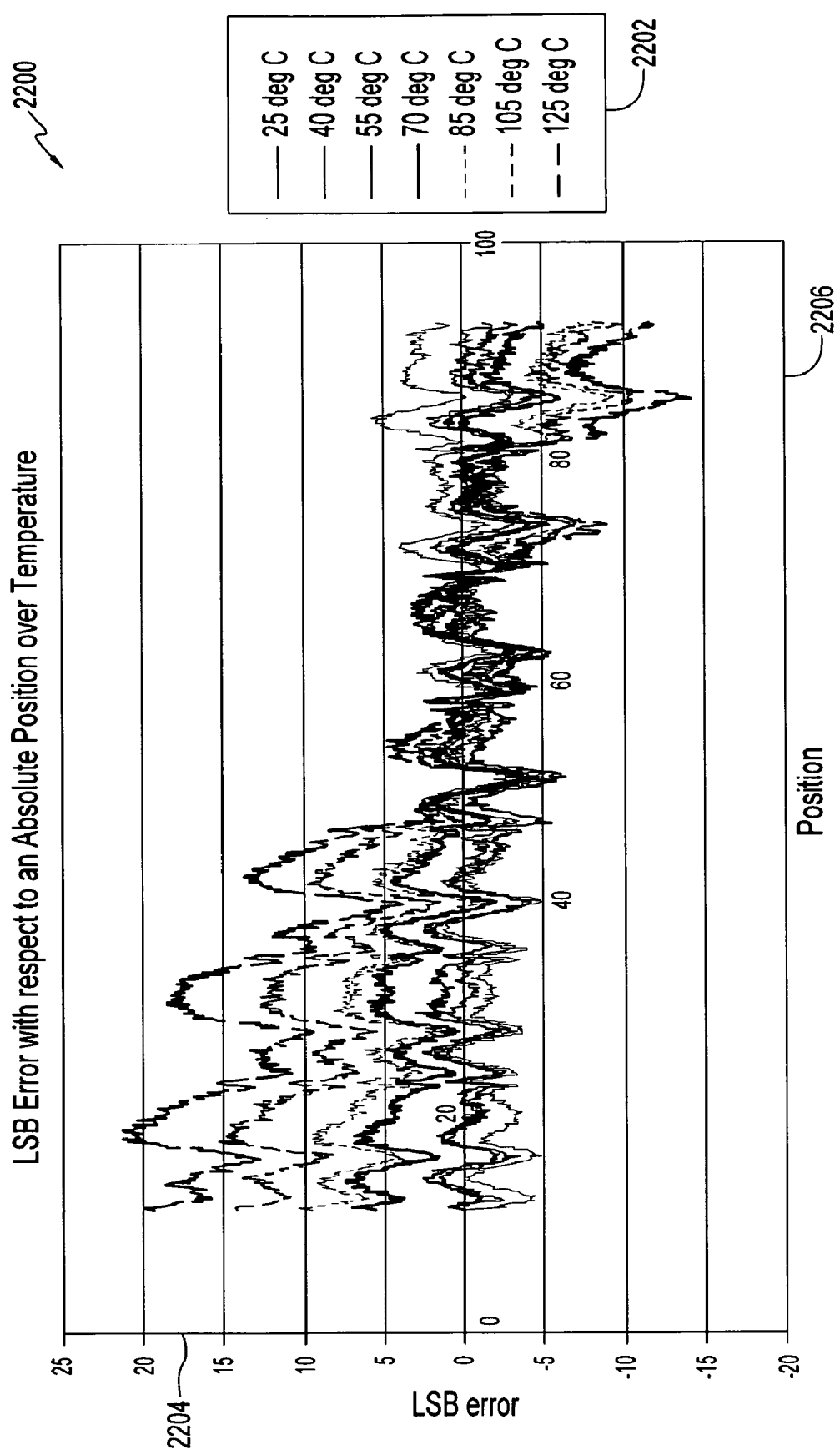
FIG. 22 illustrates a graph depicting LSB error with respect to an absolute position over temperature in accordance with a preferred embodiment.

FIG. 22 illustrates a graph 2200 depicting LSB error with respect to an absolute position over temperature in accordance with a preferred embodiment. Graph 2200 generally includes a legend 2302 that includes varying temperature ranges, which are reflected in graph 2200. An ordinate 2304 generally indicates LSB error, while an abscissa 2206 indicates position data. Graph 2200 is therefore an LSB error plot calculated when all non-compensated data sets are referenced to the same absolute position.

Figure 23:
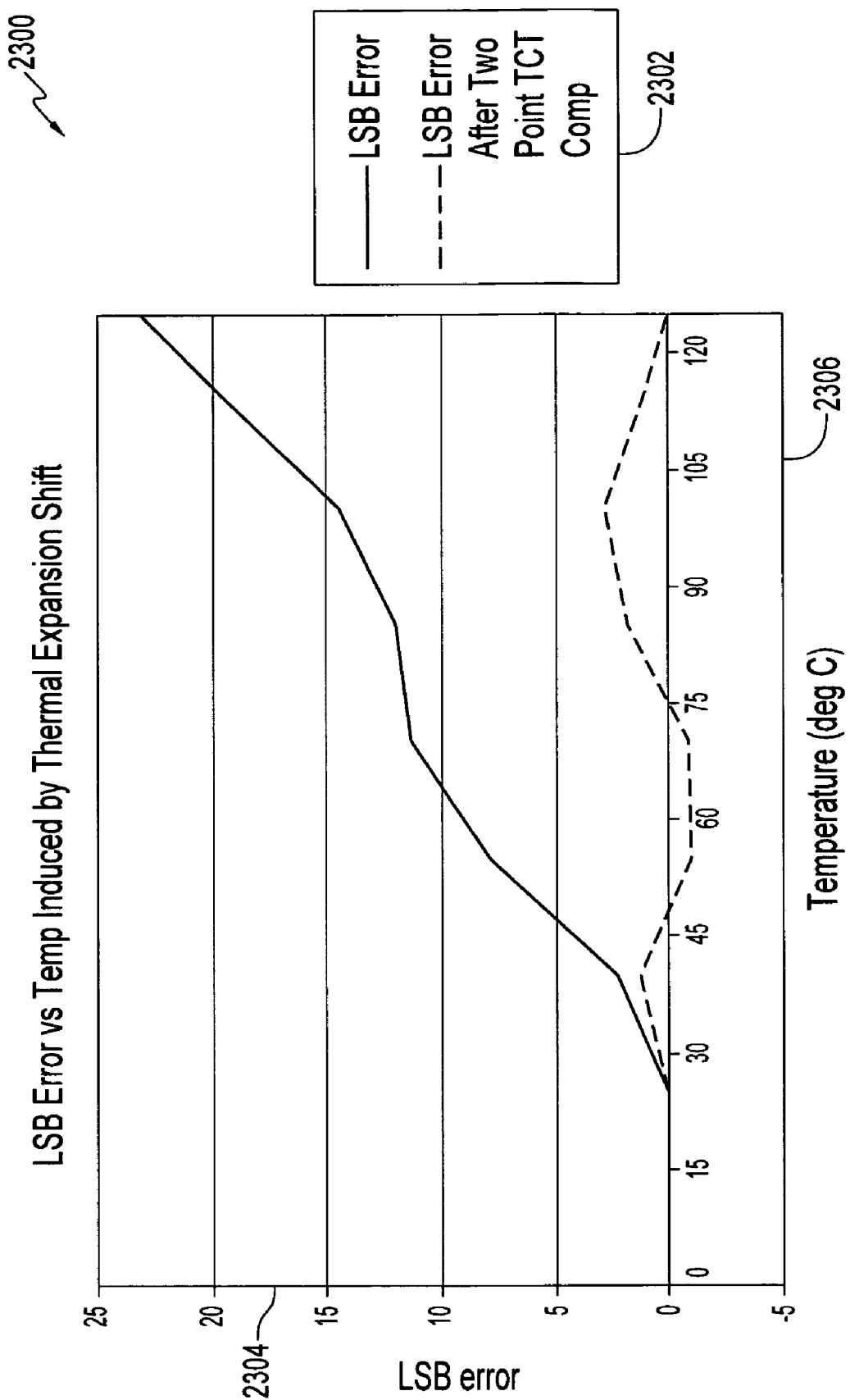
FIG. 23 illustrates a graph depicting LSB error versus temperature induced by a thermal expansion shift in accordance with a preferred embodiment.

FIG. 23 illustrates a graph 2300 depicting LSB error versus temperature induced by a thermal expansion shift in accordance with a preferred embodiment. Graph 2300 is generally associated with a legend 2202 that indicates LSB error and LSB error after a two-point $TC_T$ compensation. In graph 2300, an ordinate 2304 generally tracks the LSB error, while an abscissa 2306 tracks temperature in degrees Celsius. When utilizing a two-point linear estimation of the position change of a magnetoresistive array with respect to the magnet due to thermal expansion of the system, the induced LSB error in position can be drastically reduced as indicated in graph 2300.

Figure 24:
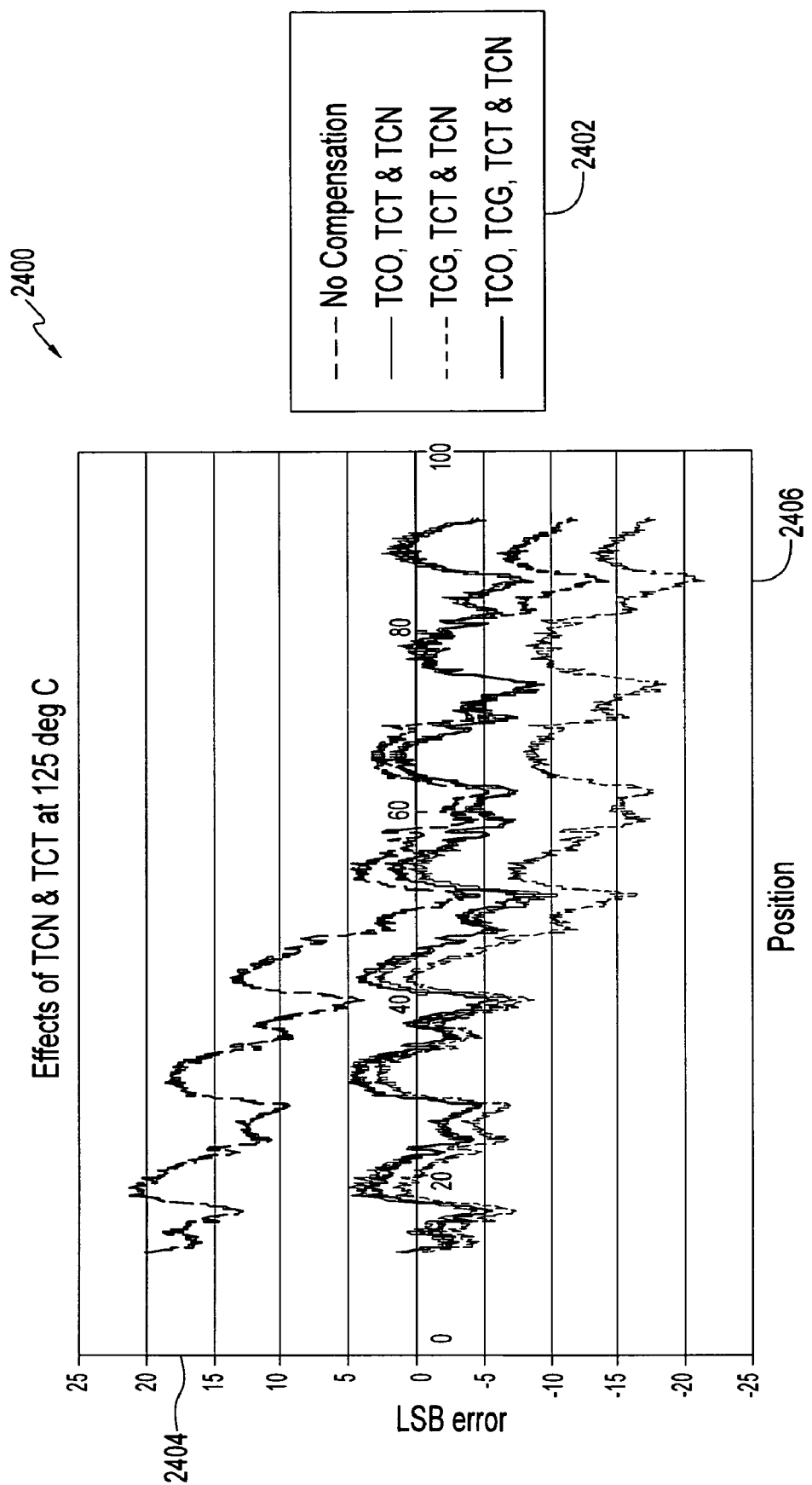
FIG. 24 illustrates a graph depicting the effects of compensating $TC_T$, $TC_N$, $TC_G$ and $TC_O$, in accordance with a preferred embodiment.

FIG. 24 illustrates a graph 2400 depicting the effects of compensating $TC_T$, $TC_N$, $TC_G$ and $TC_O$, in accordance with a preferred embodiment. Graph 2400 is associated with a ordinate 2404 that tracks the LSB error and an abscissa 2406 that tracks position data. Additionally, graph 2400 is associated with a legend 2402 that tracks the plots illustrated in graph 2400. Thus, graph 2400 indicates when compensating with $TC_T$, $TC_N$, $TC_G$ and $TC_O$, a 60% reduction in LSB error at over a change in temperature of 100° C. can be achieved (assuming the sensor was originally calibrated at 25° C.).

Figure 25:
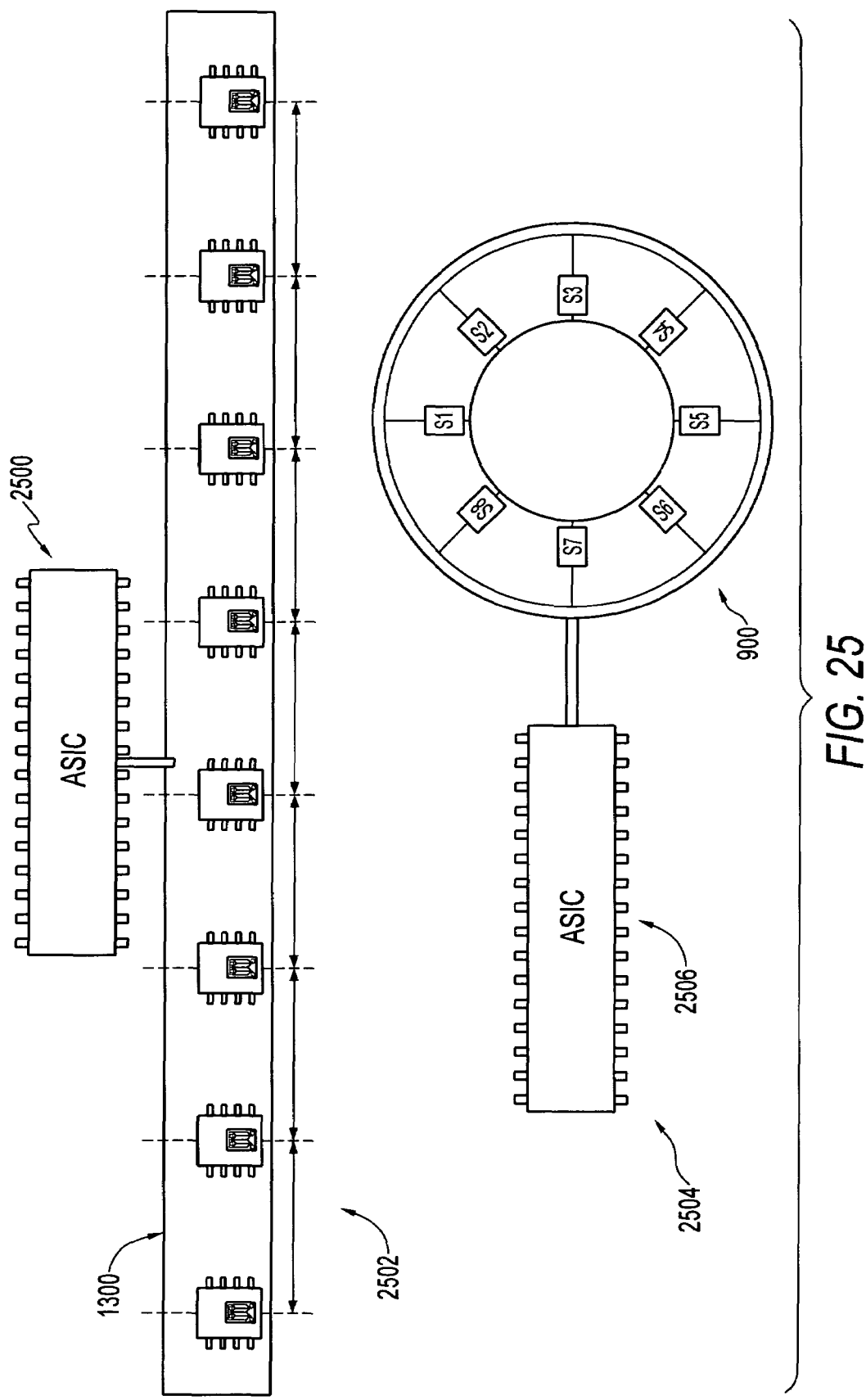
FIG. 25 illustrates block diagrams depicting two possible systems, which may be implemented in accordance with alternative embodiments.

FIG. 25 illustrates block diagrams depicting two possible systems 2502 and 2504, which may be implemented in accordance with alternative embodiments. Note that in FIGS. 9–25, identical or similar parts or elements are generally indicated by identical reference numerals. Thus, system 2502 is generally composed of the eight-bridge magnetoresistive array or system 1300 depicted in FIG. 13 in association with an ASIC 2500. In general, ASIC 2500 can be utilized to control the multiple AMR Wheatstone bridges associated with the eight-bridge magnetoresistive array or system 1300. Likewise, system 2504 includes the eight-bridge magnetoresistive array or system 900 depicted in FIG. 9 and an ASIC 2506. Again, ASIC 2506 can control the multiple AMR Wheatstone bridges that comprise the eight-bridge magnetoresistive array or system 1900.

Based on the foregoing, it can be appreciated that with $TC_N$ and $TC_T$, it is now possible not only to compensate for thermal expansion ($TC_N$) with a sensor, but also thermal expansion ($TC_T$) concerning the relative position of a magnet with respect to a magnetoresistive array.

It will be appreciated that variations of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A method for the thermal compensation of magnetic linear and rotary sensing applications, said method comprising:
   automatically amplifying and calibrating signals generated by a plurality of magnetoresistive sensing components via an integrated circuit in order to provide a full digital calibration and a ratiometric output voltage or digital output signal indicative of linear and rotary position data; and
   predicting at least one physical alteration over a particular temperature between a centerline-to-centerline distance associated with adjacent magnetoresistive sensing components among said plurality of magnetoresistive sensing components and between said plurality of magnetoresistive sensing components and at least one magnet caused by a thermal expansion thereof, in order to compensate for said thermal expansion and reduce temperature associated errors thereof.

2. The method of claim 1 wherein said plurality of magnetoresistive sensing components comprises an array of said magnetoresistive sensing components.

3. The method of claim 1 further comprising compensating for said thermal expansion within said plurality of magnetoresistive sensing components.

4. The method of claim 1 wherein said thermal expansion compensated comprises $TC_N$.

5. The method of claim 1 further comprising compensating for said thermal expansion, wherein said thermal expansion is associated with a relative position of said at least one magnet with respect to said plurality of magnetoresistive sensing components.

6. The method of claim 5 wherein said thermal expansion compensated comprises $TC_T$.

7. The method of claim 1 wherein said integrated circuit comprises an ASIC.

8. The method of claim 7 further comprising:
compensating for said thermal expansion based on a two-temperature calibration by compensating for a change in tare with respect to a particular temperature based on an equation: $Tare_{(compensated)} = Tare_{(original)} + (Temp - Temp_{(original)}) \times TC_T$.

9. The method of claim 8 further comprising processing said equation within said ASIC.

10. A method for the thermal compensation of magnetic linear and rotary sensing applications, said method comprising:
automatically amplifying and calibrating signals generated by a plurality of magnetoresistive sensing components via an integrated circuit in order to provide a full digital calibration and a ratio-metric output voltage or digital output signal indicative of linear and rotary position data, wherein said plurality of magnetoresistive sensing components comprises an array of said magnetoresistive sensing components;
predicting at least one physical alteration over a particular temperature between a centerline-to-centerline distance associated with adjacent magnetoresistive sensing components among said plurality of magnetoresistive sensing components and between said plurality of magnetoresistive sensing components and at least one magnet caused by a thermal expansion thereof; and
compensating for said thermal expansion within said plurality of magnetoresistive sensing components, in response to predicting said at least one physical alteration over said particular temperature between said centerline-to-centerline distance associated with adjacent magnetoresistive sensing components among said plurality of magnetoresistive sensing components and between said plurality of magnetoresistive sensing components and said at least one magnet caused by said thermal expansion thereof in order to reduce temperature associated errors.

11. The method of claim 10 wherein said integrated circuit comprises an ASIC.

12. A system for the thermal compensation of magnetic linear and rotary sensing applications, said system comprising:
a plurality of magnetoresistive sensing components associated with an integrated circuit, wherein signals generated by said plurality of magnetoresistive sensing components via said integrated circuit are automatically amplified and calibrated in order to provide a full digital calibration and a ratiometric output voltage or digital output signal indicative of linear and rotary position data; and
a thermal compensation module for automatically predicting at least one physical alteration over a particular temperature between a centerline-to-centerline distance associated with adjacent magnetoresistive sensing components among said plurality of magnetoresistive sensing components and between said plurality of magnetoresistive sensing components and at least one magnet caused by a thermal expansion thereof, in order to compensate for said thermal expansion and reduce temperature associated errors thereof.

13. The system of claim 12 wherein said plurality of magnetoresistive sensing components comprises an array of said magnetoresistive sensing components.

14. The system of claim 12 wherein said compensating module further compensates for said thermal expansion within said plurality of magnetoresistive sensing components.

15. The system of claim 12 wherein said thermal expansion compensated comprises $TC_N$.

16. The system of claim 12 wherein said thermal expansion is associated with a relative position of said at least one magnet with respect to said plurality of magnetoresistive sensing components.

17. The system of claim 16 wherein said thermal expansion compensated comprises $TC_T$.

18. The system of claim 12 wherein each magnetoresistive sensing component among said plurality of magnetoresistive sensing components is associated with an ASIC.

19. The system of claim 18 wherein said thermal expansion is compensated based on a two-temperature calibration by compensating for a change in tare based on a mathematical equation as follows: $Tare_{(compensated)} = Tare_{(original)} + (Temp - Temp_{(original)}) \times TC_T$.

20. The system of claim 19 wherein said equation is processed within said ASIC.

* * * * *